United States Patent [19]
Kaimai et al.

[11] Patent Number: 5,830,554
[45] Date of Patent: Nov. 3, 1998

[54] METHOD OF PRODUCING OF MICROPOROUS POLYOLEFIN MEMBRANE

[75] Inventors: Norimitsu Kaimai; Kotaro Takita; Koichi Kono, all of Kawasaki, Japan

[73] Assignee: Tonen Chemical Corporation, Tokyo, Japan

[21] Appl. No.: 718,672

[22] Filed: Sep. 24, 1996

[30] Foreign Application Priority Data

Sep. 26, 1995 [JP] Japan ................................. 7-271726

[51] Int. Cl.⁶ .............................. C08J 9/00; B32B 3/26
[52] U.S. Cl. ................ 428/131; 428/315.7; 428/333; 428/339; 264/41; 264/204; 264/210.1; 264/211.12; 264/288.8; 264/344; 528/502 B; 526/348.1; 521/143
[58] Field of Search ................. 428/131, 315.7, 428/338, 333, 339; 264/41, 204, 210.1, 211.12, 288.8, 344; 528/502 B; 526/348.1; 521/143, 62, 79

[56] References Cited

U.S. PATENT DOCUMENTS

| | | | |
|---|---|---|---|
| 5,238,618 | 8/1993 | Kinzer | 264/204 X |
| 5,376,445 | 12/1994 | Fortuin et al. | 526/348.1 X |
| 5,643,511 | 7/1997 | Pluyter et al. | 264/204 X |

FOREIGN PATENT DOCUMENTS

| | | |
|---|---|---|
| 160 551 | 11/1985 | European Pat. Off. |
| 193 318 | 9/1986 | European Pat. Off. |
| 355 214 | 2/1990 | European Pat. Off. |
| 378 279 | 7/1990 | European Pat. Off. |
| 476 198 | 3/1992 | European Pat. Off. |
| 500 173 | 8/1992 | European Pat. Off. |
| WO86/02282 | 4/1986 | WIPO. |

*Primary Examiner*—Fred Teskin
*Attorney, Agent, or Firm*—Spencer & Frank

[57] ABSTRACT

An efficient method of producing a microporous polyolefin membrane having improved tensile strength and pierce strength is provided, in which a solution having dissolved therein 5% by weight to 50% by weight of a polyolefin whose weight-average molecular weight is in the range of $5 \times 10^5$ to $2.5 \times 10^6$ and whose weight-average molecular weight to number-average molecular weight ratio is less than 10, is extruded and rapidly cooled to obtain a gel-like product which is then stretched and has remaining solvent removed therefrom.

9 Claims, No Drawings

METHOD OF PRODUCING OF MICROPOROUS POLYOLEFIN MEMBRANE

CROSS REFERENCE TO RELATED APPLICATION

This application is related to Japanese Patent Application No.271,726/1995 filed Sep. 26, 1995, the priority of which is claimed and the entire specification of which is incorporated herein by reference.

FIELD OF THE INVENTION

The present invention relates to a method of producing a microporous polyolefin membrane, and more particularly to a method of producing a microporous polyolefin membrane which has excellent strength using a polyolefin whose weight-average molecular weight and a ratio of weight-average molecular weight to number-average molecular weight (hereunder referred to as Mw/Mn) are in specified ranges.

DESCRIPTION OF THE RELATED ART

In recent years, there have been developed ultra-high molecular weight polyolefins which can form films having high strength and high elasticity, and there have been proposed various kinds of methods of producing a high strength microporous membrane using therefrom.

For example, in Japanese Patent Laid-Open No. 242035/1985, there is disclosed a method of producing microporous polyolefin membranes comprising the steps of forming a gel sheet from a solution comprising a solvent having a ultra-high molecular weight polyethylene having a weight-average molecular weight of no less than $5 \times 10^5$ dissolved therein by heating, treating the gel sheet to reduce the content of solvent to 10% by weight to 80% by weight, thermally stretching the gel sheet, and then removing the remaining solvent. However, with this method, the ultra-high molecular weight polyolefin is biaxially stretched, and it is thus necessary to prepare a dilute solution of the polyolefin. With such a solution, the amount of swelling and neck in at the exit of the die, which is used to form the sheet, is large, making the formation of a sheet difficult Furthermore, there are problems with respect to productivity. For example, the excess of solvent included in the sheet, means that a microporous membrane having the desired properties cannot be obtained by stretching the sheet as it is, and it is therefore necessary to subject the sheet to solvent removing treatment to adjust the amount of solvent in the sheet.

With the objective of solving these problems, there has been disclosed in Japanese Patent Laid-Open No. 64334/1991 a method of producing a microporous polyolefin membrane using a composition containing a ultra-high molecular weight polyolefin whose Mw/Mn ratio is in the range of 10 to 300. According to this method, it is possible to efficiently manufacture a microporous polyolefin membrane from a polyolefin which has good stretchability and which can be made into a high concentration solution.

However, with this method, although a film can be made efficiently without any need to adjust the content of the solvent in the gel sheet, the strength of the product membrane is not always sufficiently high. There has therefore been a demand in various industrial fields, particularly in the fields of batteries and separators, for a significant improvement in tensile strength and pierce strength etc. in order to prevent short circuits caused by tears in the film.

SUMMARY OF THE INVENTION

The primary objective of the present invention is to provide an efficient method of producing a microporous polyolefin membrane having improved tensile strength and pierce strength etc.

Another objective of the present invention is to provide a high quality microporous polyolefin membrane while at the same achieving of an increase in production efficiency.

The inventors of the present invention found, as a result of extensive research in light of the above-mentioned objectives, that by only dissolving a specific amount of a polyolefin having a weight-average molecular weight and a ratio of weight-average molecular weight to number-average molecular weight in specific ranges, they could increase the efficiency of producing the microporous membrane by increasing the concentration of the polyolefin solution, and that the strength of the microporous membrane thereby produced was improved, thereby completing the present invention.

Specifically the method of producing a microporous polyolefin membrane according to the present invention comprises the steps of;

preparing a solution comprising 5% by weight to 50% by weight of a polyolefin having a weight-average molecular weight in the range of $5 \times 10^5$ to $2.5 \times 10^6$, and having a Mw/Mn ratio of less than 10, and 95% by weight to 50% by weight of solvent;

extruding the solution through a die;

cooling it to form a gel-like product;

stretching the gel-like product at a temperature no more than 10° C. above the melting point of the polyolefin;

and then removing remaining solvent from the stretched product to form a microporous polyolefin membrane.

DESCRIPTION OF THE PREFERRED EMBODIMENTS

The polyolefin used in the present invention is one having a weight-average molecular weight in the range of $5 \times 10^5$ to $2.5 \times 10^6$, and preferably in the range of $1 \times 10^6$ to $2 \times 10^6$. If the weight-average molecular weight is less than $5 \times 10^5$, then the maximum stretching ratio (magnification) is low and the desired high strength microporous membrane cannot be obtained. On the other hand, if the weight-average molecular exceeds $2.5 \times 10^6$, then the solubility is reduced resulting in a decrease in the concentration of the solution and thereby making it impossible to efficiently produce the film.

Furthermore, the Mw/Mn ratio of the above-described polyolefin is less than 10, and preferably in the range of 4 to 8. If the Mw/Mn ratio is 10 or more, then although the solubility is improved, the improvement in the strength of the microporous membrane is not sufficient.

Specific examples of such a polyolefin include crystalline homopolymers and copolymers made by polymerizing monomers such as ethylene, propylene, 1-butene, 1-pentene, 4-methyl-1-pentene, 1-hexene etc. Of these, a high molecular weight polyethylene or an ultra-high molecular weight polyolefin having high density are preferred.

If required, various kinds of additives such as antioxidants, ultraviolet light absorbers, lubricants, anti-blocking agents, pigments, dyes, inorganic fillers, etc. can be added to the above polyolefin to the extent that they do not impair the attainment of the objective of the present invention.

The polyolefin solution which constitutes the starting material in the present invention is prepared by dissolving the above polyolefin in a solvent by heating.

There are no particular limitations regarding the solvent provided it is one in which the polyolefin can be sufficiently dissolved. Specific examples include aliphatic hydrocarbons such as nonane, decane, undecane, dodecane, liquid paraffin etc., cyclic hydrocarbons and mineral oil fractions having boiling points corresponding to these. However, in order to obtain a gel-like product whose solvent content is stable, it is preferred that a non-volatile solvent such as liquid paraffin be used. Some characteristic, for example boiling point ranges, of suitable non-volatile solvents such as liquid paraffin which can be used.

The step of dissolving the polyolefin in the solvent by heating is carried out by stirring the polyolefin in the solvent at a temperature at which the polyolefin is completely dissolved, or by a method involving uniform mixing in an extruder. In the case that it is dissolved by stirring in the solvent, the temperature will differ depending on the kind of polymer and kind of solvent used. For example, in the case of polyethylene, the temperature is in the range of 140° C. to 250° C. In the case that the microporous membrane is produced from a high concentration solution of the polyolefin, it is preferred that the polyolefin be dissolved in the solvent in an extruder.

In the case that the polyolefin is dissolved in the solvent in an extruder, the above-described polyolefin is first fed to the extruder having a side feeder and melted. It is then necessary to feed liquid solvent from the side feeder to this melted polyolefin. If the polyolefin containing high molecular weight polyolefin and the solvent are fed at the same time, then the extreme difference in viscosity between the two makes it impossible to mix the two, and a solution cannot be prepared because the polyolefin and extruder screw move around together. By adding the solvent to the melted polyolefin and then carrying out mixing in the extruder in the above-mentioned way, it becomes possible to prepare a uniform and high concentration solution of the polyolefin in a short time.

It is preferred that the concentration of the polyolefin solution be in the range of about 5% by weight to about 50% by weight and more preferably in the range of about 10% by weight to about 20% by weight. If the concentration of the polyolefin solution is less than about 5% by weight, then not only is it uneconomic due to the large amount of solvent used, the amount of swell and neck in at the exit of the die when the solution is formed into a sheet is large making the formation of a sheet difficult. On the other hand, if the concentration of the polyolefin solution exceeds about 50% by weight, then it becomes difficult to prepare a uniform solution. Furthermore, it is preferred that antioxidants be added when thermally dissolving the polyolefin in order to prevent oxidation of the polyolefin.

Next, this heated solution of polyolefin is subjected to forming preferably by extrusion through a die. A standard rectangular-shaped sheet die is used, but it is also possible to use an inflation die having a double cylinder shape, etc. When that a sheet die is used, the die gap is normally 0.1 mm to 5 mm and the extrusion forming temperature is in the range of 140° C. to 250° C. The extrusion speed is usually between 20 cm/min-30 cm/min and 2 m/min-3 m/min.

The solution which has been extruded through the die in this way, is then formed into a gel-like product by cooling. It is preferred that the cooling be effected at a rate of 50° C./min or more at least until the gelation temperature is reached. In general, if the cooling rate is slow, the higher order structure of the obtained gel-like product becomes rough, and the pseudo cell units which form this higher order structure also become large, but if the cooling rate is high, they become fine cell units. If the cooling rate is less than 50° C./min, then the degree of crystallization increases, and it is difficult to obtain a gel-like product suited for stretching. Accordingly, by controlling the cooling rate, it is possible to alter the pore diameter of the product microporous membrane.

Examples of cooling methods that can be used include methods involving direct contact with a cooling medium such as cold air, cold water, etc., and methods involving contact with a roller cooled by a cooling medium. It is also possible to take up the solution extruded from the die before cooling or during cooling, at a take up ratio between 1 and 10, and preferably between 1 and 5. A take up ratio of greater than 10 is not desirable because the amount of neck in becomes large, and there is the tendency for breakage to occur during subsequent stretching.

Next, the gel-like product is subjected to stretching. This is done by heating the gel-like product and stretching it to a specified magnification using a tenter method, a roll method, an inflation method, a rolling method or a combination of these methods. Either monoaxial stretching or biaxial stretching is possible, but biaxial stretching is preferred. In the case of biaxial stretching, either sequential stretching or simultaneous stretching in perpendicular directions may be used.

The stretching temperature is preferably no higher than 10° C. above the melting point, and more preferably is no lower than the crystal dispersion temperature and no higher than the melting point. For example, in the case of polyethylene, a temperature in the range of 90° C. to 140° C. is preferred. A temperature greater than 10° C. above the melting point is not desirable for the orientation of the molecule chains by stretching, due to melting of the resin.

The stretching ratio (magnification) will depend on the thickness of the starting sheet, but in the case of monoaxial stretching, a magnification of ×2 or more is preferred, and a magnification of ×3 to ×30 is further preferred. In the case of biaxial stretching, the magnification of area is preferably at least ×10, and more preferably is in the range of ×15 to ×400. If the magnification of area is less than ×10, then the stretching is insufficient, and a microporous film having high elasticity and high strength cannot be obtained. On the other hand a magnification of area exceeding ×400 has practical limitations with respect to the stretching apparatus, stretching operation etc.

The stretched product is then washed to remove remaining solvent. Examples of materials which can be used as the washing solvent include readily volatile materials such as ethers such as dioxane, diethyl ethers etc., hydrocarbons such as pentane, hexane, heptane etc., chlorohydrocarbons such as dichloromethane, tetrachloromethane, etc. and fluorohydrocarbons such as trifluoroethane. The type of solvent used is appropriately selected from the above in accordance with the type of solvent used to dissolve the polyolefin. A single type can be used on its own, or a mixture of two types can be used. The washing can be carried out using a method in which the product is soaked in the solvent followed by extraction, a method in which the product is showered with the solvent, or a combination of these methods.

The above-described washing process is carried out until the amount of solvent remaining in the stretched product is less than 1% by weight. Thereafter, the washing solvent is dried. This drying can be carried out by a variety of methods such as drying by heating, air-drying by hot air, drying by contact with a heated roller, or drying by soaking in a heated medium.

It is then desirable that the dried stretched product be subjected to thermal fixing at a temperature between the crystal dispersion temperature and the melting point. If the thermal fixing temperature is greater than the melting point, then the resin melts. The period over which thermal fixing treatment is carried out will vary depending on the thermal fixing temperature, but a period in the range from 10 seconds to 10 minutes is preferred.

The microporous polyolefin film obtained by the above-described method has a porosity preferably in the range of 30% to 95%; a gas permeability at a film thickness of 25 μm of preferably no more than 2000 sec/100 cc, and more preferably in the range of 200 sec/100 cc to 1000 sec/100 cc; an average pore diameter preferably in the range of 0.005 μm to 1 μm, and more preferably in the range of 0.01 μm to 0.2 μm; a tensile breaking strength preferably no less than 800 kg/cm$^2$, and more preferably no less than 900 kg/cm$^2$; and a pierce strength preferably not less than 450 g.

Furthermore, the thickness of the microporous polyolefin membrane can be selected appropriately, but it is preferred that it be in the range of about 0.1 μm to about 50 μm, and more preferably in the range of 1 μm to 25 μm. If the thickness is less than 0.1 μm, then it is difficult to use the membrane in a practical application due to the lack of mechanical strength of the film. On the other hand, a membrane having a thickness exceeding 50 μm is also not desirable since the membrane is too thick and the effective resistance becomes high.

The reason why the desirable effects described above are produced is not exactly clear, but it is thought that by using a polyolefin whose weight-average molecular weight is specified to be in the range of $5 \times 10^5$ to $2.5 \times 10^6$ and whose Mw/Mn ratio is less than 10 results in an increase in strength due to the formation of micropores by the cleavage of lamella crystals and the entanglement to a proper degree of the polymer molecules, and in an increase in the solubility due to the specific molecular weight. In particular, it is thought that, when a polyolefin whose weight-average molecular weight is high but whose Mw/Mn ratio is greater than 10 is used, then the degree of entanglement of molecules is not sufficient making it impossible to obtain a high strength microporous membrane.

EXAMPLES

Hereunder, examples of the present invention shall be described. The scope of the present invention shall not be limited by these embodiments. The test methods used in the examples are as follows:

(1) Weight-average molecular weight: GPC device made by Waters Kabushiki Kaisha is used. GMH-6 made by Tosoh Corporation is used as the column, and o-dichlorobenzene is used as the solvent. Measured by a gel permeation chromatography (GPC) method at a temperature of 135° C. and a flow rate of 1.0 ml/min.

(2) Membrane Thickness: Measured for at a cross-section by a scanning electron microscope (μm).

(3) Porosity: Measured by a gravimetric method (%).

(4) Tensile breaking strength: The breaking strength of a sample strip having a width of 15 mm was measured according to ASTMD 882 (kg/cm$^2$).

(5) Average Pore Diameter: Measured using a nitrogen gas adsorption-desorption pore diameter measuring apparatus (made by Nikkaki Kabushiki Kaisha) (μm).

(6) Pierce Strength: A needle having a diameter of 2 mm and a point radius of 1 mm was pushed into the microporous film at a rate of 2 mm/sec, and the load at which the film broke was measured (g).

(7) Gas Permeability: Measured according to JIS P8117 (seconds/100 cc).

EXAMPLES 1 to 3 and COMPARATIVE EXAMPLES 1 to 5

To 100 parts by weight of a high density polyethylene having a weight-average molecular weight(Mw) and a Mw/Mn ratio as shown in Table 1, or a composition thereof, was added 0.375 parts by weight of an antioxidant, and the resulting composition was fed into a twin screw extruder (58 mm φ, L/D=42, Strong Mixing Type). From the side feeder of the extruder was fed liquid paraffin in such an amount that the ethylene concentration reached the proportions shown in Table 1 (polyethylene+liquid paraffin=100% by weight percent), and a polyethylene solution was prepared in the extruder. Next, the solution was extruded at 200° C. through a T-die provided at the end of the extruder, and a gel sheet which would give a microporous membrane thickness of about 25 μm was formed, whilst taking up with a take up roller.

The thus obtained gel sheet was set in a biaxial stretching machine, and simultaneous biaxial stretching was carried out at a temperature of 115° C., a film production rate of 5 m/min, and an area magnification of 5×5. The stretched membrane was then washed with dichloromethane and remaining liquid paraffin was removed by extraction. It was then dried at room temperature, and subjected to thermal fixing treatment for 30 seconds at 120° C. to obtain a microporous polyethylene membrane. The results are shown in Table 1.

TABLE 1

| | INVENTIVE EXAMPLES | | | COMPARATIVE EXAMPLES | | | | |
|---|---|---|---|---|---|---|---|---|
| | 1 | 2 | 3 | 1 | 2 | 3 | 4 | 5 |
| Polyethylene Mw | $1.0 \times 10^6$ | $5.0 \times 10^5$ | $2.0 \times 10^6$ | $2.0 \times 10^6$ (13.3 wt %) $6.8 \times 10^5$ (86.7 wt %) | $1.0 \times 10^6$ (13.3 wt %) $6.8 \times 10^5$ (86.7 wt %) | $5.0 \times 10^5$ | $5.0 \times 10^5$ | $3.0 \times 10^6$ |
| Mw/Mn | 4.2 | 6.9 | 8.0 | 16.8 | 12.0 | 11.0 | 6.9 | 5.0 |
| Conc. of polyethylene In solution (wt %) | 15 | 20 | 10 | 15 | 15 | 20 | 60 | 8 |

TABLE 1-continued

| | INVENTIVE EXAMPLES | | | COMPARATIVE EXAMPLES | | | | |
|---|---|---|---|---|---|---|---|---|
| | 1 | 2 | 3 | 1 | 2 | 3 | 4 | 5 |
| Stretching Conditions | | | | | | | | |
| Temperature (°C.) | 115 | 115 | 115 | 115 | 115 | 115 | *2 | *2 |
| Magnification (MD × TD) | 5 × 5 | 5 × 5 | 5 × 5 | 5 × 5 | 5 × 5 | 5 × 5 | — | — |
| Microporous Membrane Properties | | | | | | | | |
| Membrane thickness (μm) | 23 | 25 | 23 | 24 | 25 | 25 | — | — |
| Porosity (%) | 41 | 40 | 41 | 41 | 37 | 38 | — | — |
| Breaking Strength *1 (kg/cm²) | 1200 | 940 | 1100 | 790 | 770 | 650 | — | — |
| Pierce Strength (g) | 580 | 465 | 553 | 405 | 426 | 331 | — | — |
| Gas Permeability (sec/100 cc) | 529 | 391 | 406 | 452 | 2400 | 65000 | — | — |
| Average Pore Diameter (μm) | 0.02 | 0.03 | 0.02 | 0.03 | 0.04 | 0.05 | — | — |

*1 Tensile Strength in the MD direction
*2 Non-uniform solution - no formation of film possible

EFFECT OF THE INVENTION

As described above, the method of producing a microporous polyolefin membrane according to the present invention uses a polyolefin whose weight-average molecular weight and Mw/Mn ratio are specified within a specific range, making it possible to efficiently produce a microporous film having micropores and which in particular displays excellent strength.

Accordingly, the polyolefin membrane obtained by the method of the present invention can be used in various applications. For example, when used in batteries or separators, it does not tear and so internal short circuits can be prevented.

What is claimed is:

1. A method of producing a microporous polyolefin membrane comprising the steps of:

preparing a polyolefin solution comprising 5% by weight to 35% by weight of a polyolefin having a weight-average molecular weight in the range of $5 \times 10^5$ to $2.5 \times 10^6$, and having a weight-average molecular weight to number-average molecular weight ratio of less than 10, and 95% by weight to 50% by weight of solvent;

extruding the solution through a die;

cooling the extruded solution to form a gel-like product;

stretching the gel-like product at a temperature no more than 10° C. above the melting point of the polyolefin to form a stretched product;

and removing remaining solvent from the stretched product to form a microporous polyolefin membrane.

2. The method of producing a microporous polyolefin membrane according to claim 1 wherein the polyolefin has a ratio of weight-average molecular weight to number-average molecular weight in the range of 4 to 8.

3. The method of producing a microporous polyolefin membrane according to claim 1 wherein said solution comprises 10% by weight to 20% by weight of polyolefin and 90% by weight to 80% by weight.

4. The method of producing a microporous polyolefin membrane according to claim 1 wherein the weight-average molecular weight of the polyolefin is in the range of $1 \times 10^6$ to $2 \times 10^6$.

5. The method of producing a microporous polyolefin membrane according to claim 1 wherein the step of cooling the solution extruded through the die is carried out at a cooling rate of not less than 50° C./min at least until the gelation temperature is reached.

6. The method of producing a microporous polyolefin membrane according to claim 1 wherein the stretching temperature is not less than the crystal dispersion temperature of the polyolefin and not more than the melting point of the polyolefin.

7. A microporous polyolefin membrane obtained by the method of claim 1.

8. The microporous polyolefin membrane according to claim 7 having a porosity in the range of 30% to 95%, a gas permeability of no more than 2000 sec/100 cc, an average pore diameter in the range of 0.005 μm to 1 μm, and a pierce strength of not less than 450 g.

9. The method of producing a microporous polyolefin membrane according to claim 2, wherein said solution comprises 10% by weight to 20% by weight of polyolefin and 90% by weight to 80% by weight of solvent.

* * * * *